United States Patent [19]

Huss

[11] Patent Number: 5,191,248
[45] Date of Patent: Mar. 2, 1993

[54] CONNECTION FOR ROTATING DIODE PACKAGE

[75] Inventor: John B. Huss, Rockford, Ill.

[73] Assignee: Sundstrand Corporation, Rockford, Ill.

[21] Appl. No.: 594,330

[22] Filed: Oct. 9, 1990

[51] Int. Cl.$^5$ ............................................. H02K 11/00
[52] U.S. Cl. .................. 310/68 D; 310/68 R; 310/71
[58] Field of Search .............. 310/68 D, 68 R, 71, 310/91, 114; 376/327

[56] References Cited

U.S. PATENT DOCUMENTS

| | | | |
|---|---|---|---|
| 2,863,105 | 11/1955 | Ross | 310/68 D |
| 3,586,892 | 7/1969 | Sato | 310/68 D |
| 3,872,335 | 3/1975 | Petersen et al. | 310/68 D |
| 3,902,774 | 9/1975 | Gronholm | 310/68 D |
| 4,052,631 | 10/1977 | Kuter | 310/68 D |
| 4,482,827 | 11/1984 | Baldwin | 310/68 D |
| 4,603,344 | 7/1986 | Trommer | 357/76 |
| 4,670,678 | 6/1987 | Jager et al. | 310/68 D |
| 4,745,314 | 5/1988 | Nakano | 310/57 |
| 4,855,100 | 4/1989 | Shallenberger et al. | 376/327 |
| 4,888,151 | 12/1989 | Gjertsen et al. | 376/327 |
| 4,987,328 | 1/1991 | Shahamat | 310/68 D |
| 5,008,574 | 4/1991 | Kitahata | 310/68 D |

Primary Examiner—Steven L. Stephan
Assistant Examiner—Matthew Nguyen
Attorney, Agent, or Firm—Whitham & Marhoefer

[57] ABSTRACT

An improved connection arrangement is provided for forming the electrical connection between a rotor winding and a rotatable diode pack, mounted on the rotor, in which rotor winding terminals are compressably sandwiched between the diode pack and the rotor or a diode pack mounting arrangement, such as an end winding support, attached thereto. By sandwiching the winding terminal in this manner, mechanical stresses and strain hardening of the connection may be avoided to increase reliability. Further mechanical support for the electrical connection is also provided while avoiding the use of parts which significantly contribute to the overall length of the electrical machine.

17 Claims, 4 Drawing Sheets

CONNECTION FOR ROTATING DIODE PACKAGE

BACKGROUND OF THE INVENTION

1. Field of the Invention

The present invention generally relates to rotating electrical machines and, more particularly, to such machines which have rotor windings connected to a group of diodes, formed as a package and mounted on the rotor.

2. Description of the Prior Art

Rotating electrical machines, such as motors and generators, have long been known and highly sophisticated designs have been developed over the years. Many advances have been made for the purpose of reducing size and cost of such electrical machines, among which has been the provision of a rotating diode package which is physically mounted on the rotor of the electrical machine to simplify assembly and reduce overall length of the machine. This type of arrangement is particularly applicable to electrical machines in which the rotor carries windings to which the diode package is electrically connected. A two pole generator, with reference to which the invention will be explained in detail, is typical of such machines.

Conventionally, the connection of the diode package to the rotor is made by the provision of a connector socket on the rotor which is adapted to receive connections formed on the diode package. The form of such diode packages has become standardized to simplify assembly and repair procedures and this portion of the connection is quite reliable. However, the connection of the connector to the rotor windings is usually formed by crimping the connector to the wire forming the rotor winding. Forming a terminal of the windings by crimping is desirable since it is quickly and easily done with very simple plier-like tools and the process can be automated with minimal tooling.

The deformation of both the connector and the wire lead during crimping causes some strain hardening of the metal of both elements. The length of these leads is not mechanically supported and is subject to stress from centrifugal forces when the machine is in operation as well as forces from angular acceleration and deceleration and vibration of the electrical machine, including rotational vibration. Also, the joint is subject to thermal stresses due to dissipation of heat from both the windings and the diode package. Additionally, the insertion of the pins or bolts into the connector disturbs the connection of the connector to the winding lead and induces further strain hardening and metal fatigue. For this reason, this particular electrical connection has a very high failure rate. Moreover, since such a structure is not easily susceptible to measurement of the degree of strain hardening which exists at a particular time, the failure rate is not easily reduced by maintenance procedures which, due to the requirement of disassembly and reassembly during maintenance, contributes to the development of strain hardening and brittleness. For this reason, any possible measurement of strain hardening would not reflect the condition of the connection after reassembly.

In addition, the use of such a connector tends to increase the overall length of the rotor and the overall length of the electrical machine without an increase in the power thereof. For many applications, the ability to minimize the size and weight of an electrical machine having given electrical specifications is critical to the suitability of a particular electrical machine for some applications, such as in aircraft systems.

SUMMARY OF THE INVENTION

It is therefore an object of the present invention to provide a connection between the rotor windings and the diode package which is not disturbed during assembly of the diode package and the rotor.

It is another object of the invention to provide a structure which will mechanically support the winding terminal leads during operation of the electrical machine.

It is a further object of the invention to provide a structure which is easily assembled with the rotor and provides mechanical support for the end turns of the rotor winding.

It is yet another object of the invention to provide a connection of improved reliability between the rotor of an electrical machine and a diode pack which is mounted on the rotor which reduces the overall length of the rotor and the electrical machine and which is economical to fabricate.

It is another further object of the invention to provide a connection arrangement for the rotor of an electrical machine which permits the use of renewable parts to increase the useful lifetime of the electrical machine.

In order to achieve the foregoing objects of the invention, a connection arrangement is provided including a termination of the rotor winding including a rotor winding lead and means, included in or attached to the rotor, for receiving a means capable of producing a compressional force and having at least one surface opposable to at least one connection surface of an electrical device such as a diode pack.

In accordance with another aspect of the invention such a connection arrangement is provided in combination with an end turn winding support for the rotor of the electrical machine.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
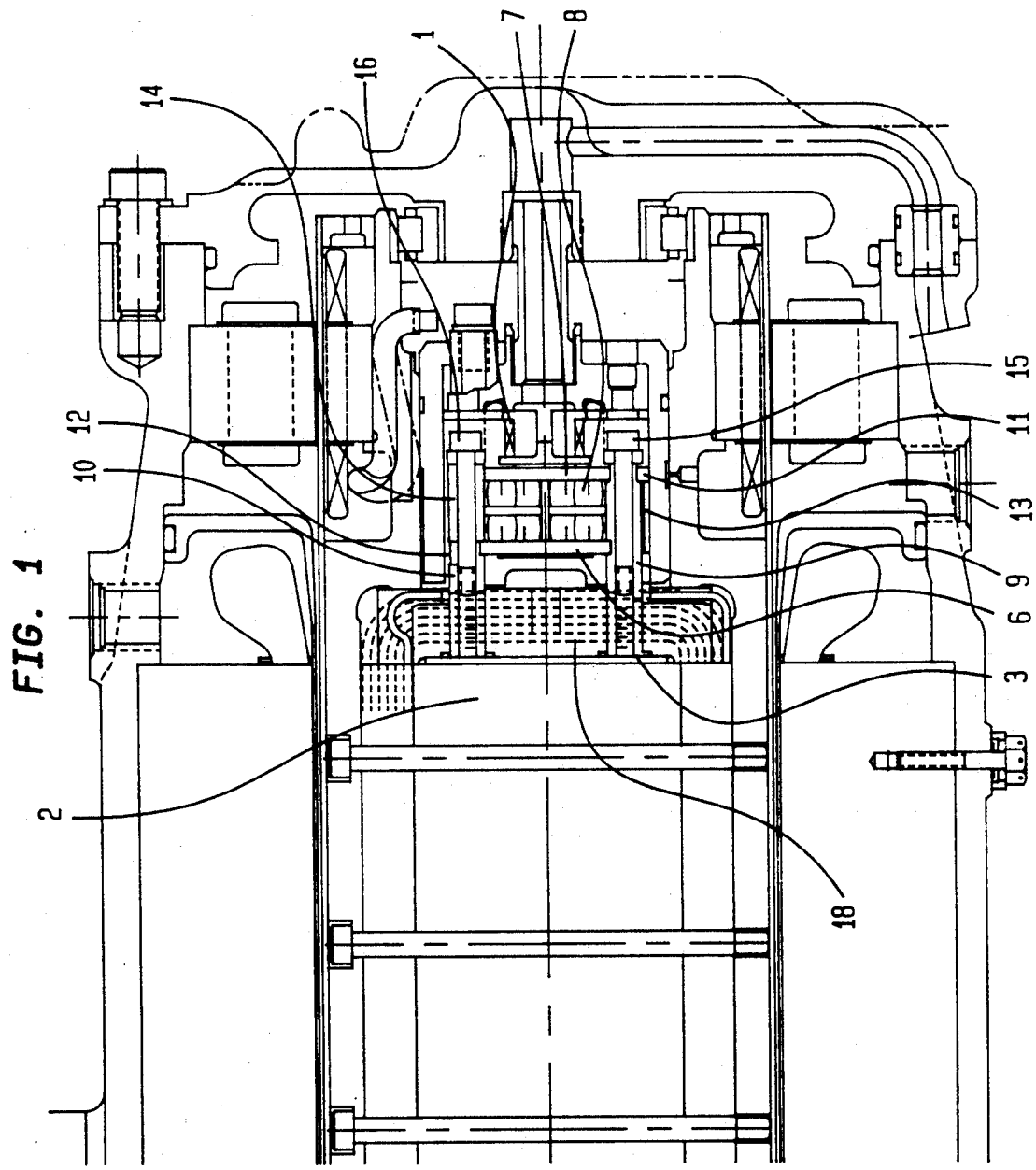
FIG. 1 is a sectional view of a generator including the invention.
Figure 3:
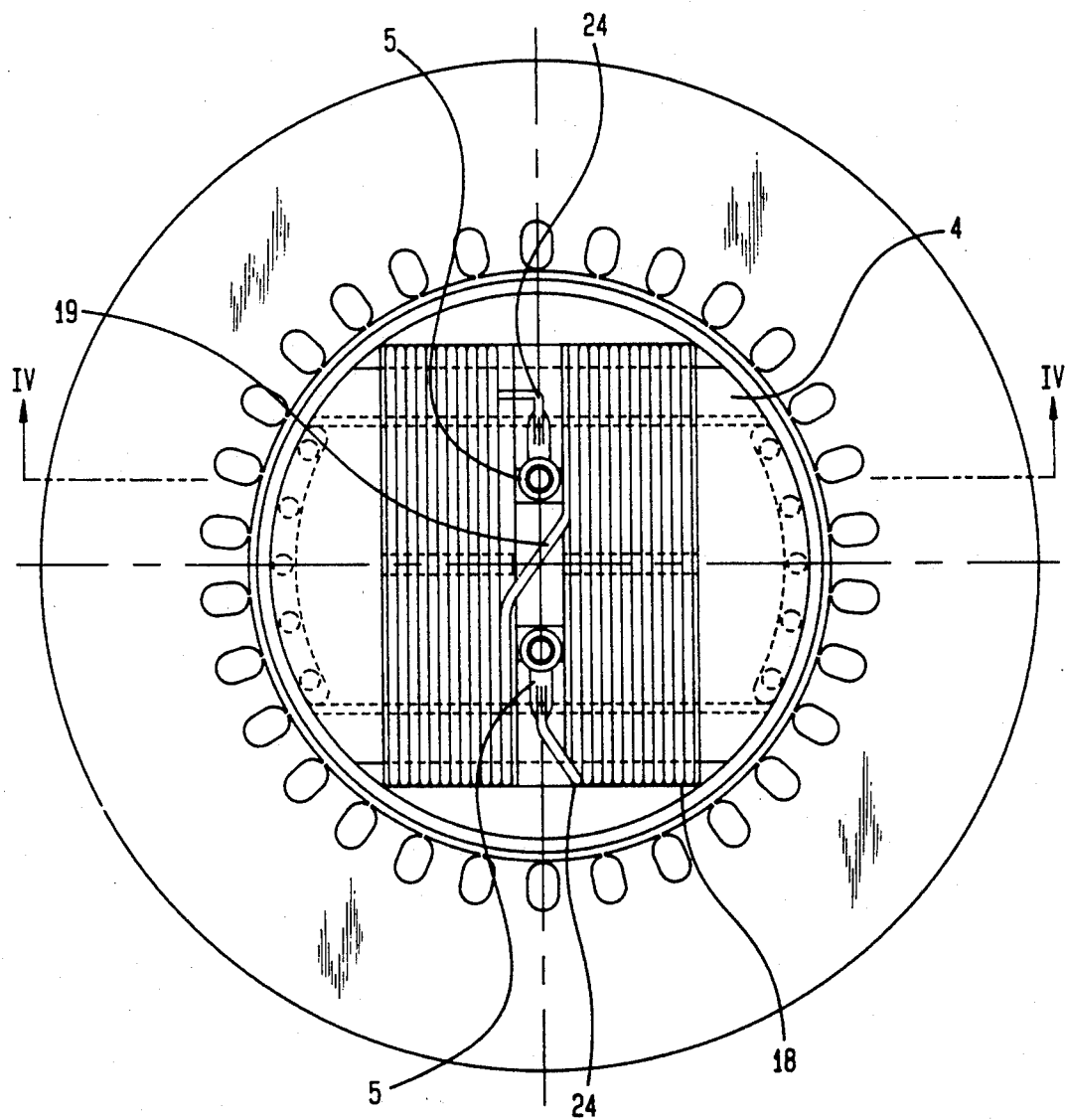
FIG. 3 is an end view of the generator of FIG. 1 including the end turn assembly including the invention.

Referring now to the drawings, and more particularly to FIG. 1 and FIG. 3, there is shown a sectional view of a wound field generator which is representative of electrical machines with which the invention is usable, and including the connection structure comprising the invention. The generator includes diode package 1 mounted on rotor 2. The rotor windings 18 are preferably formed on the rotor structure together with an end form support 4. The terminations of the windings are crimped to terminals 5.

Figure 1A:
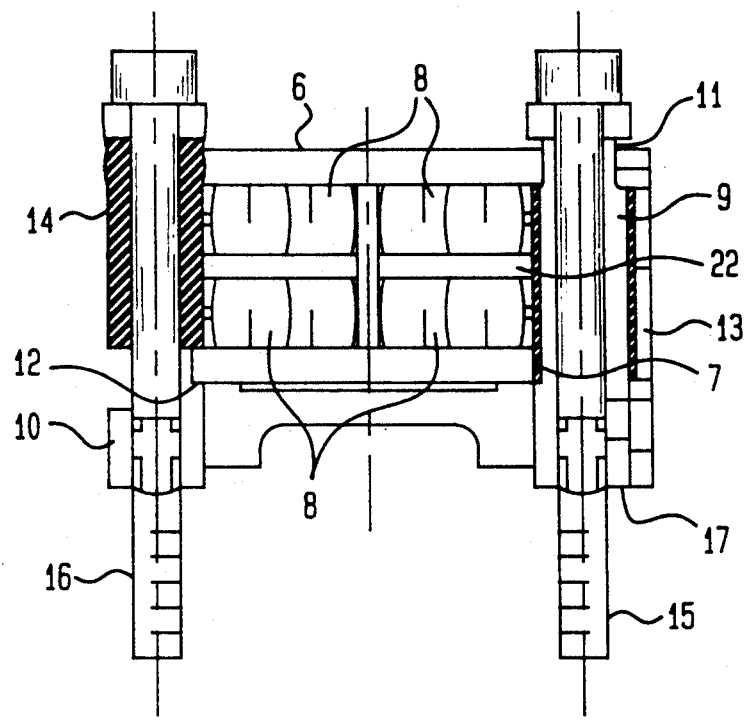
FIG. 1A is an enlarged view of the diode package of FIG. 1.

A typical structure of the diode package 1 is illustrated in greater detail in FIG. 1A. While the features of the diode package are not considered to be a part of this invention, an understanding of the structure will assist in the understanding of the invention. Other internal structures of the diode package are equally applicable to the practice of the invention, as will be discussed below, as long as the diode package can be mounted to the rotor by a mechanical structure which is capable of maintaining a compressional force against a part of the rotor at a point where electrical connections are to be made.

Figure 1B:
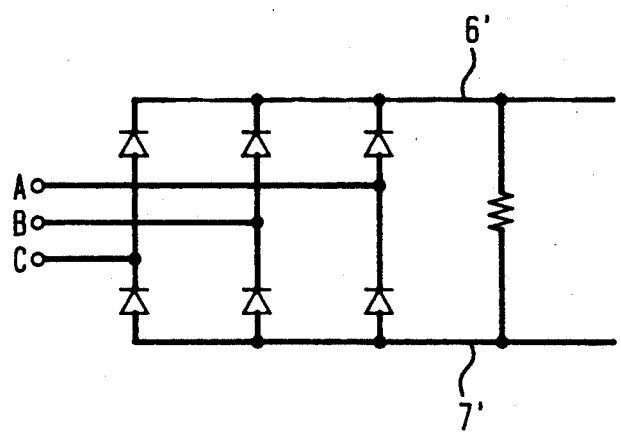
FIG. 1B is a circuit diagram of the diode package of FIG. 1A.

The diode package typically includes a sectored plate 22 which is typically radially symmetrical to provide selected connections to diodes symmetrically arranged around the generator shaft. For example, if the generator is to be a three-phase generator, the sectored plate 22 will have three sectors, each sector forming a junction between two diodes 8. This circuit is illustrated in FIG. 1B. Thick plates 6 and 7, corresponding to connections 6' and 7' of FIG. 1B, to which the rotor winding is to be connected, form connections to the other terminal of each group of diodes. These thick plates 6, 7 are, in turn connected to conductive tubes 9, 10, preferably of copper, by brazing or soldering at points 11, 12. The plates 6, 7 and conductive tubes 9, 10, respectively, are insulated from each other by insulating tubes 13, 14. The common diode connections to the rotor windings are formed, in the prior art by bolts 15, 16 which pass through the tubes and typically screw into connection terminals provided on the rotor. Hence, conductive tubes 9, 10 as well as insulating tube 14 also bear a compression load and must be of a suitable thickness for that purpose.

In contrast, the connection according to the invention exploits only the ability of the tubes 9, 10 to bear a compressional load in order to form a mechanically sound electrical connection. By applying only a compressional force to the rotor winding lead terminals, this connection can be achieved with little or no mechanical disturbance of the terminals and strain hardening of these parts is avoided, as will now be explained.

According to the invention, bolts 15, 16 screw into holes 4, which may be internally threaded. However, threaded engagement of the bolts with holes 4' are preferably formed by threaded inserts 3, which do not form part of the electrical circuit but allow a compression connection to be made from the diode pack conductive tubes 9, 10 to terminals 5 preferably crimped to the rotor winding leads as particularly illustrated in FIG. 2. Since this mechanical connection does not form a part of the electrical circuit, the holes for receiving bolts 15, 16 can be formed as bosses 31 on the rotor core or separately formed and attached to the rotor core by an adhesive of other means. Preferably, the holes for receiving bolts are formed in a rotor winding end turn support which is either affixed to the rotor or held in place thereon by the rotor windings. Regardless of the particular structure for receiving the bolts 15, 16, that structure, according to the invention, will preferably include a rotor winding lead support portion having a contour 22 against which the rotor winding lead can be dressed for structural support. This support portion will also preferably have a profile such as indicated by dotted line 23 or surface 4' which, with respect to which contour 22, forms a groove for lateral support of rotor winding lead 24 and connector terminal 5. A potting material can also be deposited in such a groove to achieve even greater rigidity and commonality of support for the winding lead and the terminal crimped thereto.

Figure 2:
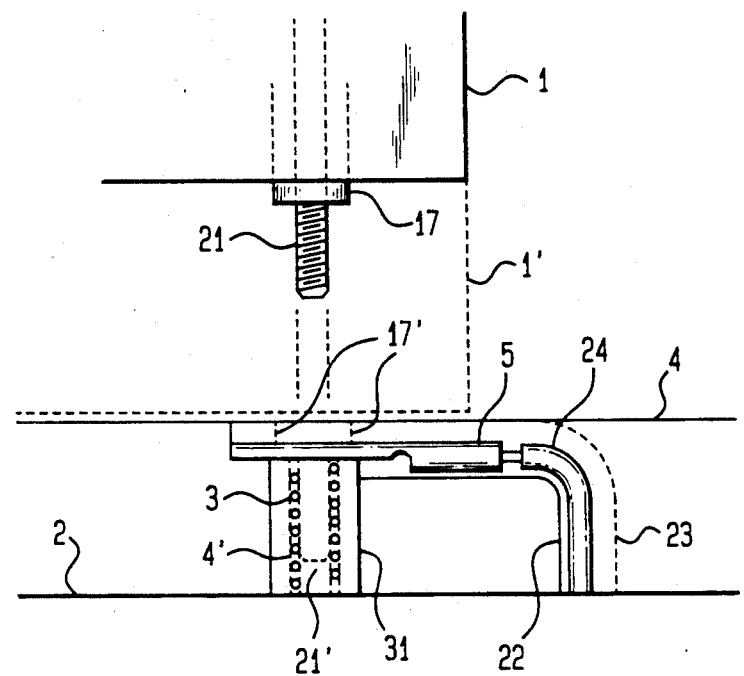
FIG. 2 is a schematic view of the structure according to the invention.

When the diode package 1 is to be assembled with the rotor, it is first brought into alignment with the rotor such that bolts 15, 16, exemplified by bolt 21 in FIG. 2 align with holes 4'. As the bolts are tightened and diode package 1 is brought into the location indicated by dotted line 1', ends 17 of connector tubes 9, 10 are compressed against terminal 5, as illustrated by dotted lines 17'. It should be noted that the bolt 21 then assumes the position indicated by dotted line 21', engaging insert 3 against the inside of hole 4'. The electrical connection from the diode pack 1 to the rotor winding terminal 5 and the rotor winding lead 24 is formed by the compressional force between connector tube end 17 and the opposing surface of the body, such as end winding support 4, in which hole 4' is formed, sandwiching terminal 5 therebetween. Again, it should be noted from FIG. 2 that the engagement of bolt 21 with the interior of hole 4', preferably through an insert such as helicoil is, does not necessarily form part of the electrical connection while absorbing all of the torsional stress due to the tightening of bolt 21 during assembly.

Accordingly, it is seen that the position of terminal 5 and winding lead 24 is undisturbed during assembly and the electrical connection between terminal 5 and winding lead 24 is mechanically supported against movement both during assembly and subsequent operation. By the provision of this common support for the terminal and the lead, flexure of these elements and their connection to each other is avoided, additional strain hardening of these parts is avoided during both assembly and operation and the reliability of the connection is greatly improved.

A preferred form of the invention will now be discussed with reference to FIGS. 3–5. In FIG. 3, a cross section of the electrical machine is illustrated showing an end view of the rotor thereof. The rotor winding is typically formed in two portions although the winding will be continuous with a cross-over connection 19. In the preferred form of the invention, a winding end turn support 4 is provided which is generally disk-shaped and of the same diameter as the rotor and functions to reduce windage losses of the rotor. This end turn support also serves the function of structurally supporting the windings where they emerge from the ends of the rotor. Typically, rotor winding end turn supports will be provided on both ends of the rotor but the invention will typically be applied to only one, in dependence on the type of electrical machine and the number of diode packs and connections which must be made to the rotor windings.

Figure 4:
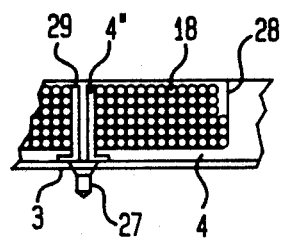
FIG. 4 is a sectional view of an end turn assembly including the invention along section line IV—IV of FIG. 3.

A shown in the cross-section of FIG. 4, taken at section IV—IV of FIG. 3, the rotor windings hold the end turn support 4 in place against the rotor core and the end turn support therefore need not be attached to the rotor core, although such attachment may be made desirable by some assembly procedures. The end turns of the rotor winding are supported by the walls of grooves 28, 29. The end turn support may also include a reinforcing member 4" or the hole 4' may be formed directly in the end turn support. Alternatively, as indicated above, a boss can be formed or a connector provided on the rotor structure with or without an end turn support and would preferably have the general form of reinforcing member 4". This alternative form of connectors car be attached to the rotor by means of a mating recess and tenon as indicated at 27. An end turn support, if used, could be accurately located on the rotor by the protruding portion 4". Alternatively, the end turn support, with or without reinforcement 4", can similarly be accurately located on the rotor by a recess and tenon formed as indicated at 27.

Figure 5:
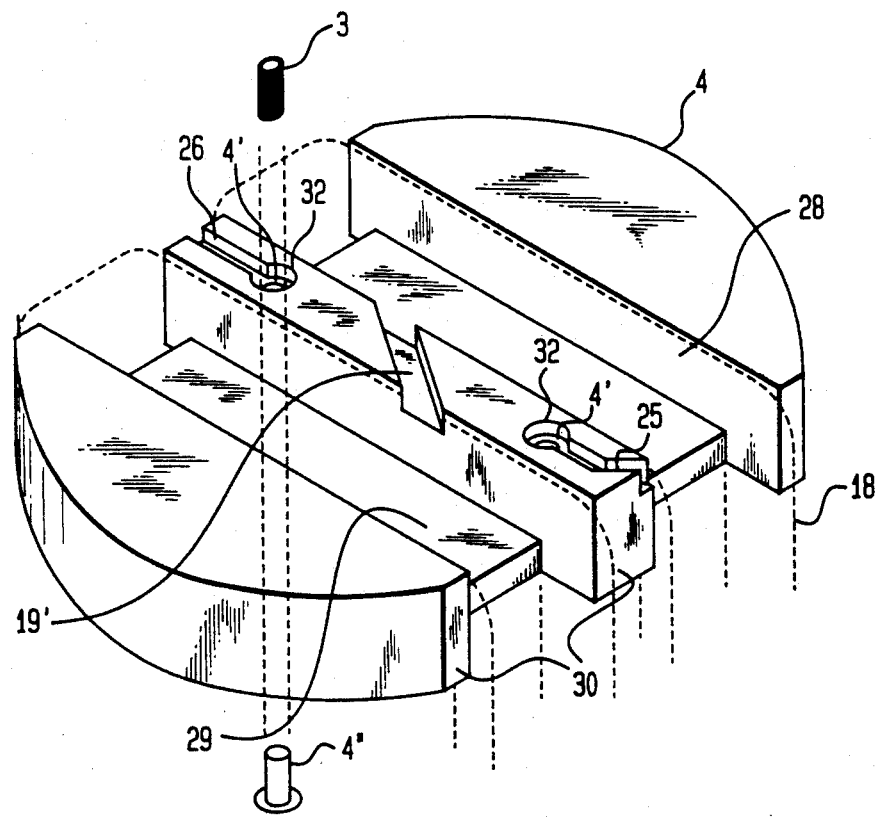
FIG. 5 is an isometric view of the end turn assembly including the invention.

An overall isometric view of the end turn support in accordance with a preferred form of the invention is illustrated in FIG. 5. The generally disk shaped form of end turn support 4 has large grooves 28, 29 to support the end turns of the rotor winding 18. The sides of the disk may be truncated as desired at surfaces 30 to minimize windage losses. The central portion of the end turn support 4 will include a groove 19' to receive the crossover connection 19 between portions of the winding. The central portion of the end turn support will also include holes 4', each surrounded by a recess 32 which recesses respectively open into grooves 25 and 26. Grooves 25, 26 can be formed along any path which is convenient to the points at which the winding leads emerge from the rotor core. As previously indicated, the holes 4' are preferably fitted with a reinforcement 4" and/or a helicoil insert which is advantageously used to simplify formation of the end turn support by avoiding the need to provide screw threads on the interior of hole 4' or reinforcement 4" and allows renewal of the part during repair. Such a helicoil structure is preferably fabricated from beryllium copper alloy but other durable and relatively incompressible materials may also be used. The end turn support can be fabricated from any non-conductive material and is preferably formed by casting or injection molding.

During manufacture or assembly of the rotor, the end turn support is fitted with reinforcements 4", if used and fitted to the rotor core. Alternatively, reinforcement 4" can be molded into the end turn support. The windings 18 are then formed in a manner well-understood in the art and hold the end turn support 4 in place on the rotor. After completion of the rotor in this fashion, insert 3, if used, may be installed and terminals 5 crimped onto the ends of the winding leads 24. The winding leads and terminals are then dressed into grooves 25, 26 and a potting material, if used, may be applied to the grooves as discussed above. At this point, the diode pack 1 can be installed by means of screws or plugs 15, 16 to complete the rotor.

In view of the foregoing, a connection arrangement between a rotating diode pack, mounted on the rotor of an electrical machine and the rotor winding of the electrical machine has been provided which is not subject to strain hardening of the elements of the electrical circuit during assembly or operation and, hence, of enhanced reliability. The connection arrangement according to the invention also avoids the use of parts which contribute to the overall length of the electrical machine and simplifies assembly of the electrical machine, thereby reducing cost of both manufacture and repair. The arrangement also permits the use of renewable parts to further enhance economy and to increase the useful life of electrical machines in which the invention is employed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A connection arrangement between an electrical device, said electrical device having at least one connection surface capable of bearing a compressional force and mounting means, adjacent said connection surface, for producing said compressional force, and a rotor winding on a rotor of an electrical machine, said connection arrangement between said electrical device and said rotor including:
   a termination of said rotor winding including a rotor winding lead and
   means, included by said rotor, for receiving said mounting means for producing a compressional force, said means for receiving said mounting means further including at least one surface opposable to said at least one connection surface to engage said termination of said rotor winding.

2. A connection arrangement as recited in claim 1 wherein said termination of said rotor winding includes a terminal, said terminal being compressible between said at least one connection surface and said at least one surface opposable to said at least one connection surface.

3. A connection arrangement as recited in claim 1 wherein said means for receiving said means capable of producing a compressional force and having at least one surface opposable to said at least one connection surface further includes means for supporting said termination of said rotor winding including a portion of said rotor winding lead.

4. A connection arrangement as recited in claim 1, wherein said electrical device is a diode pack.

5. A connection arrangement between an electrical device, said electrical device having at least one connection surface capable of bearing a compressional force and mounting means, adjacent said connection surface, for producing said compressional force, and a rotor winding on a rotor of an electrical machine, said connection arrangement between said electrical device and said rotor including:
   a termination of said rotor winding including a rotor winding lead and
   end winding support means including means for receiving said mounting means for producing a compressional force, said means for receiving said mounting means further including at least one surface portion opposable to said at least one connection surface to engage said termination of said rotor winding.

6. A connection arrangement as recited in claim 5 wherein said termination of said rotor winding includes a terminal, said terminal being compressible between said at least one connection surface and said at least one surface opposable to said at least one connection surface.

7. A connection arrangement as recited in claim 6 wherein said means for receiving said means capable of producing a compressional force and having at least one surface opposable to said at least one connection surface further includes means for supporting said termination of said rotor winding including a portion of said rotor winding lead.

8. A connection arrangement as recited in claim 5, wherein said electrical device is a diode pack.

9. A rotor for an electrical machine including a rotatable diode pack, said diode pack having at least one connection surface capable of bearing a compressional force and mounting means, adjacent said connection surface, for producing said compressional force, said rotor including a connection arrangement for electrically connecting said diode pack, and a rotor winding on said rotor including:

a termination of said rotor winding including a rotor winding lead and means for receiving said mounting means for producing a compressional force, said means for receiving said mounting means further including at least one surface opposable to said at least one connection surface to engage said termination of said rotor winding.

10. A rotor as recited in claim 9 wherein said termination of said rotor winding includes a terminal, said terminal being compressible between said at least one connection surface and said at leas one surface opposable to said at least one connection surface.

11. A rotor as recited in claim 10 wherein said means for receiving said means capable of producing a compressional force and having at least one surface opposable to said at least one connection surface further includes means for supporting said termination of said rotor winding including a portion of said rotor winding lead.

12. An end turn support for a rotor of an electrical machine including means for receiving a means for producing a compressional force and having at least one surface portion adjacent said means for receiving said means for producing a compressional force and opposable to a connection surface of an electrical device for compressably engaging a termination of a rotor winding, wherein said termination of said rotor winding includes a terminal means and said at least one surface portion opposable to a connection surface for compressably engaging a termination of a rotor winding further includes a portion having a contour for commonly supporting said terminal means and said termination of said rotor winding.

13. An end turn support as recited in claim 12 wherein said means for receiving a means capable of producing a compressional force comprises a hole.

14. An end turn support as recited in claim 13 wherein said means for receiving said means capable of producing a compressional force further includes a means for providing threaded engagement between said means capable of producing a compressional force and said hole.

15. An end turn support as recited in claim 14 wherein said means for providing threaded engagement between said means capable of producing a compressional force and said hole includes an insert means within said hole.

16. An end turn support as recited in claim 15 wherein said insert means is a reinforcement means.

17. An end turn support as recited in claim 16 wherein said reinforcement means is a helicoil insert.

* * * * *